United States Patent [19]

Slovinsky

[11] 4,363,734

[45] Dec. 14, 1982

[54] 1,3-DIHYDROXY ACETONE AS AN OXYGEN SCAVENGER FOR WATER

[75] Inventor: Manuel Slovinsky, Woodridge, Ill.

[73] Assignee: Nalco Chemical Company, Oak Brook, Ill.

[21] Appl. No.: 296,925

[22] Filed: Aug. 27, 1981

Related U.S. Application Data

[63] Continuation-in-part of Ser. No. 231,824, Feb. 5, 1981, abandoned.

[51] Int. Cl.³ .............................. C02F 1/20; C02F 1/70
[52] U.S. Cl. .................................... 210/750; 210/757; 252/188.28; 252/393; 252/396; 252/400 R; 252/404; 252/407; 422/13
[58] Field of Search ................. 210/750, 757; 252/81, 252/178, 188, 393, 396, 400 R, 404, 407; 422/13, 14, 19

[56] References Cited

U.S. PATENT DOCUMENTS

| | | | |
|---|---|---|---|
| 2,957,009 | 10/1960 | Holmquist | 252/407 |
| 3,026,331 | 3/1962 | Hoeksema | 252/407 |
| 3,259,457 | 7/1966 | Sauls | 252/188 |
| 3,265,747 | 8/1966 | Cormany | 252/407 |
| 3,448,119 | 6/1969 | Fletcher | 252/188 |
| 3,551,349 | 12/1970 | Kallfass | 252/393 |
| 3,868,425 | 2/1975 | Kleiman | 252/407 |
| 4,019,859 | 4/1977 | Lavin et al. | 422/19 |
| 4,278,635 | 7/1981 | Kerst | 210/757 |

FOREIGN PATENT DOCUMENTS 2257705  8/1975  France ......................... 422/13

Primary Examiner—Ernest G. Therkorn
Attorney, Agent, or Firm—John G. Premo; Robert A. Miller

[57] ABSTRACT

An improved method for scavenging dissolved oxygen from alkaline waters which comprises using dihydroxy acetone catalyzed with at least 1 percent based on the weight of said dihydroxy acetone, of a catalyst from the group consisting of hydroquinone and a water-soluble compound of manganese.

3 Claims, 3 Drawing Figures

1,3-DIHYDROXY ACETONE AS AN OXYGEN SCAVENGER FOR WATER

THE INVENTION

The present invention relates to the scavenging of oxygen from aqueous systems.

The invention specifically relates to the use of catalyzed 1,3-dihydroxy acetone for scavenging oxygen from water.

The amount of acetone utilized to scavenge oxygen may be expressed in the terms of moles of 1,3-dihydroxy acetone per mole of oxygen (O). Generally, amounts as little as 2:1 may be used although it is preferred to use up to as much as 20:1.

1,3-dihydroxy acetone operates in waters having a pH greater than 7 with a preferred pH being 9 or greater.

The materials used to catalyze 1,3-dihydroxy acetone under the previously described conditions may be either hydroquinone or a water-soluble compound of manganese. The amount of manganese, as Mn, and hydroquinone used to catalyze 1,3-dihydroxy acetone ranges from as little as 1% up to as much as 20% based on 1,3-dihydroxy acetone. Typical of the water-soluble manganese compounds that may be used are the manganese halides such as manganese chloride or bromide. Also, the water-soluble manganese sulfates, phosphates, and nitrates may be used. Further, water-soluble chelates of manganese are included as types of materials that may be used.

TEST METHOD

A four neck 500 ml reaction flask was fitted with a small rubber septum, a three-way connecting tube holding a thermometer and a venting stopcock, a stopcock connected to a funnel and an Orion Research oxygen electrode, Model 97-08. This oxygen electrode is connected to a pH meter in the prescribed manner for direct reading of the oxygen concentration. The flask is filled through the funnel with air-saturated water obtained by bubbling air through water at room temperature for two hours, making sure that no air is trapped in the flask. The stopcocks are closed. The oxygen content of this water is 8-9 ppm. The solution of the oxygen scavenger candidate is then injected into the magnetically stirred water with a syringe through the septum cap and readings of the oxygen concentration are made every 5 seconds after injecting 0.25 ml of 25% NaOH to take pH to 10.7.

The results of the various tests illustrating the invention are shown in FIGS. 1-3.

Figure 1:
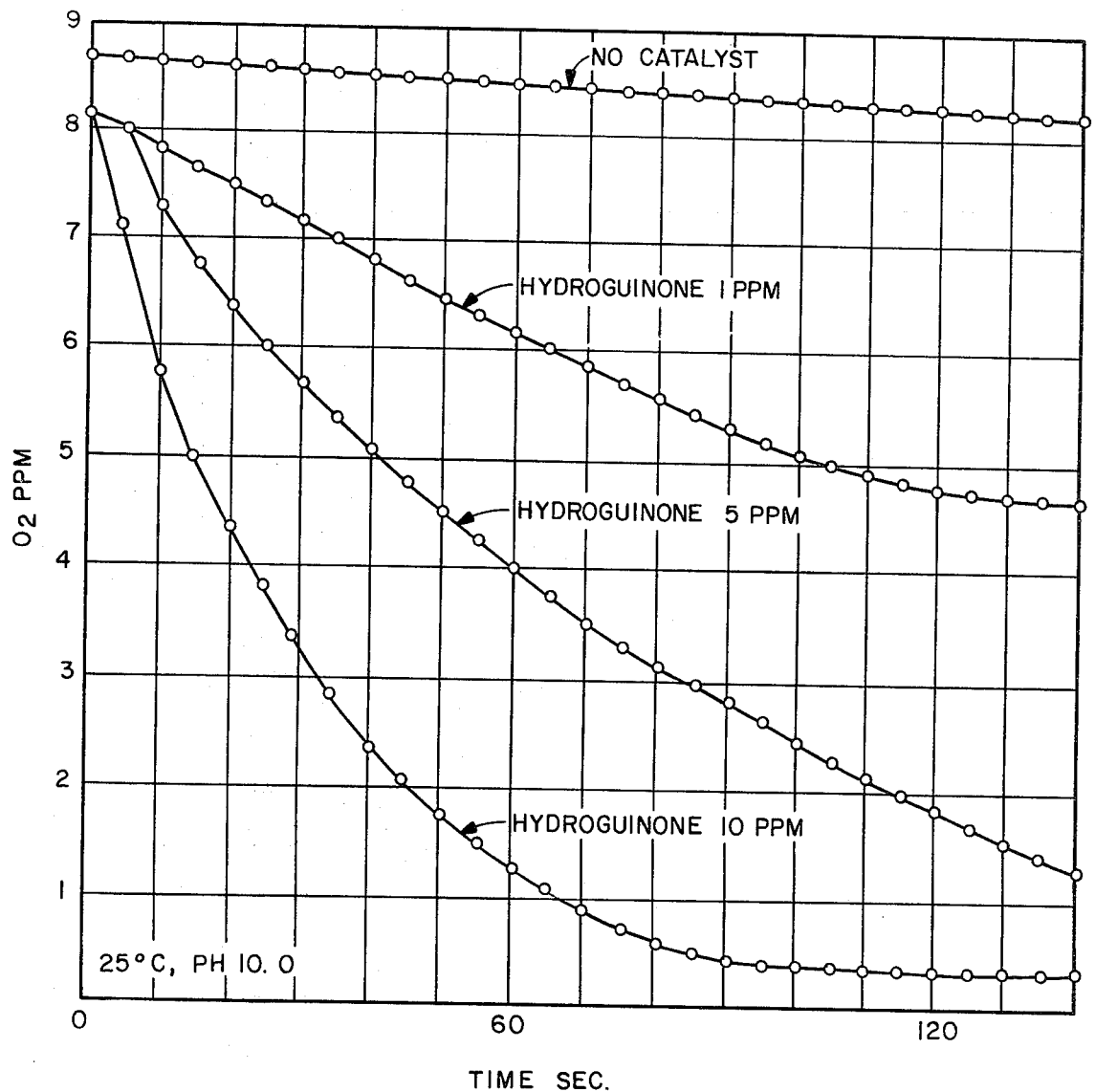
FIG. 1 shows the effect of 1,3-dihydroxy acetone catalyzed at various levels by hydroquinone. 100 ppm of the dihydroxy acetone material was present in all cases. Temperature was 25° C., pH was 10.
Figure 2:
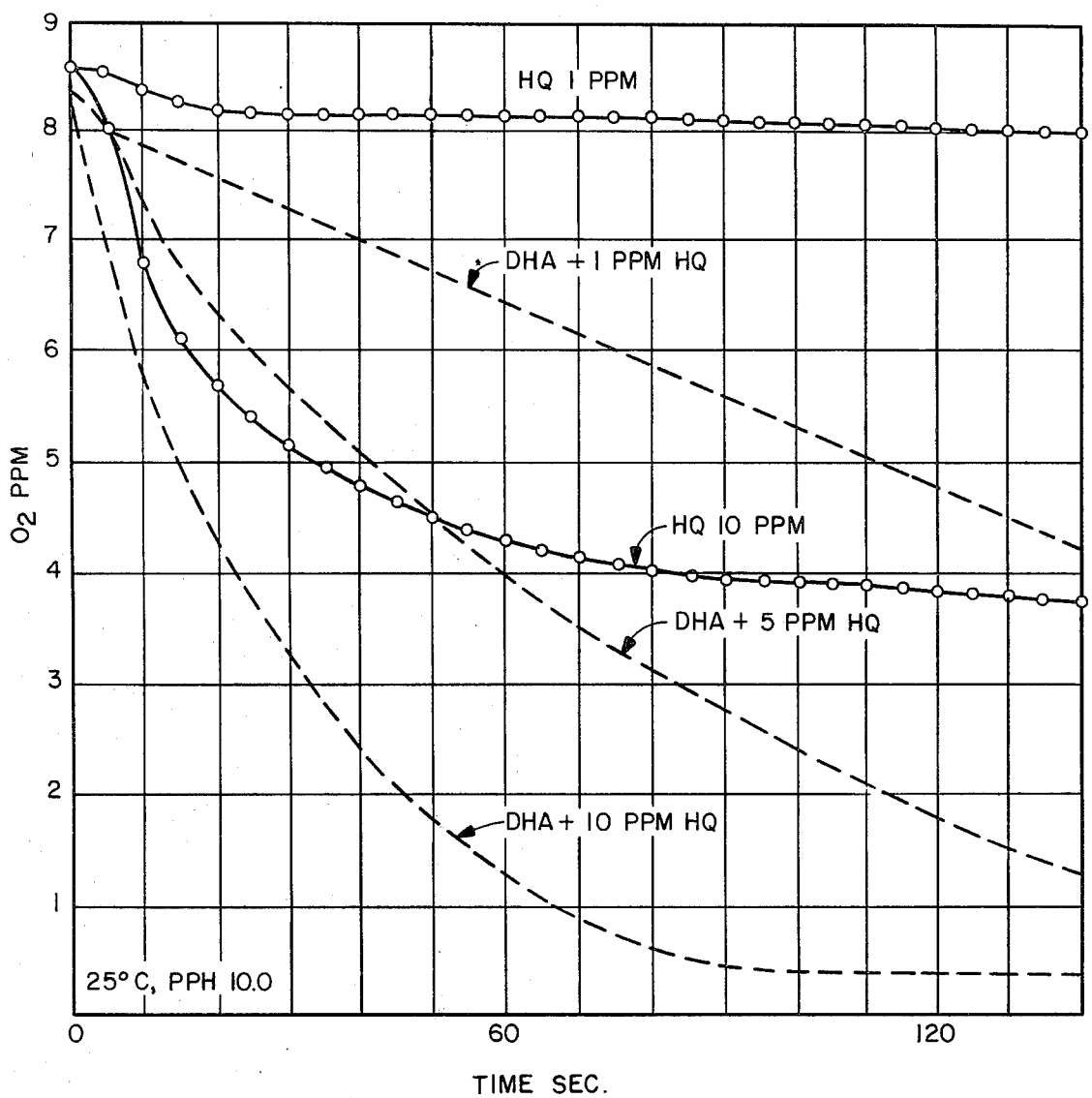
FIG. 2 shows the effect of hydroquinone by itself at 1 ppm and at 10 ppm.
Figure 3:
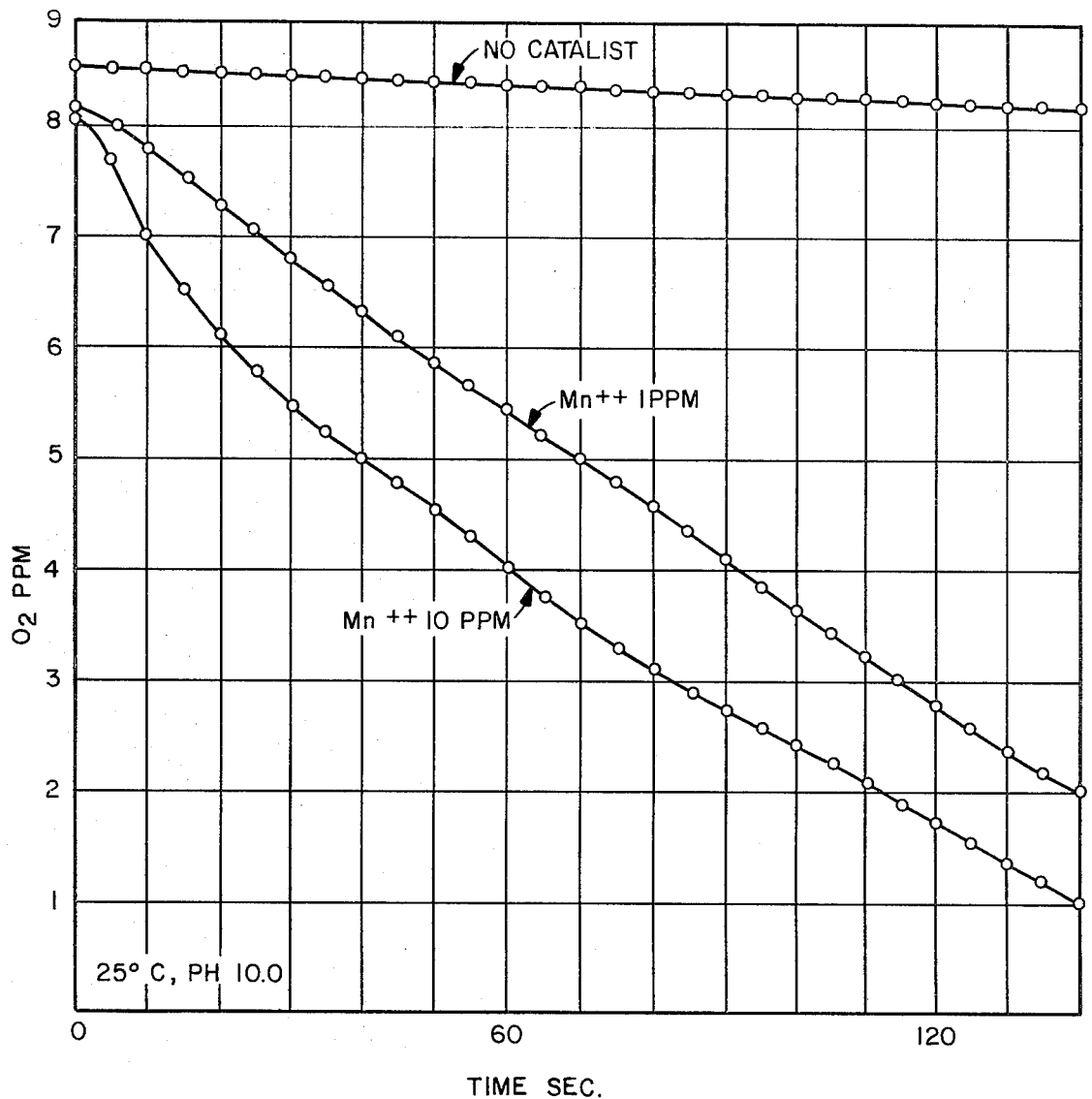
FIG. 3 shows the catalysis of 100 ppm of 1,3-dihydroxy acetone using no catalyst, and 1 ppm and 10 ppm additions respectively of a $Mn^{+2}$ catalyst material.

The data shows the surprising effect of dihydroxy acetone when catalyzed with either hydroquinone or a water-soluble compound of manganese.

It is interesting to note that when a water-soluble cobalt compound was tested as a catalyst for 1,3-dihydroxy acetone, it was substantially ineffective.

Having thus described my invention, it is claimed as follows:

1. An improved method for scavenging dissolved oxygen from alkaline waters which comprises using dihydroxy acetone catalyzed with at least 1 percent, based on the weight of said dihydroxy acetone, of a catalyst from the group consisting of hydroquinone and a water-soluble compound of manganese.

2. The method of claim 1 where the catalyst is hydroquinone.

3. The method of claim 1 where the catalyst is a water-soluble compound of manganese.

* * * * *